Patented Aug. 9, 1949

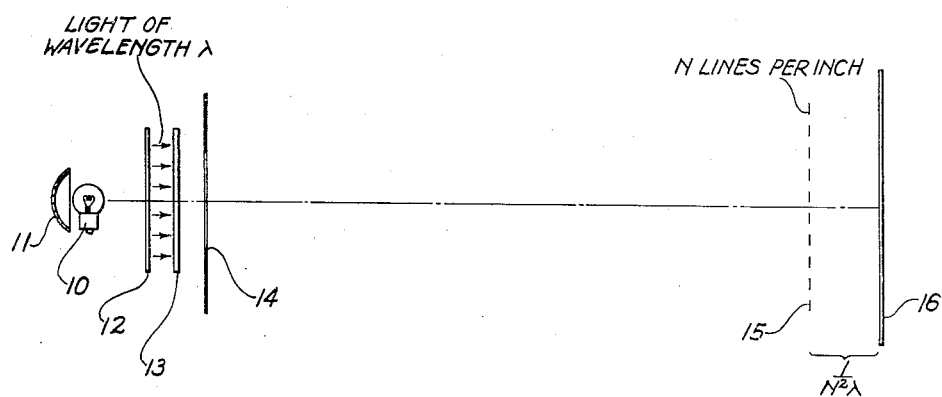

2,478,444

UNITED STATES PATENT OFFICE 2,478,444

MANUFACTURE OF PHOTOGRAPHIC CONTACT SCREENS

John A. C. Yule and Frederick B. Johnston, Rochester, N. Y., assignors to Eastman Kodak Company, Rochester, N. Y., a corporation of New Jersey Application May 18, 1946, Serial No. 670,735

4 Claims. (Cl. 95—81)

This invention relates to the manufacture of contact or vignetted halftone screens, i. e. screens with graded elements for use in contact with a sensitive emulsion. Specifically the present invention is an improvement over the methods described in U. S. Patents 2,292,313 Yule, 2,304,988 Yule, and 2,311,071 Murray.

The primary object of the present invention is to provide a method of making contact screens with the proper distribution of density in the individual elements. The present invention is particularly useful in the manufacture of fine line screens having at least 200 lines to the inch.

The present invention is primarily concerned with the screen spacing, i. e. the spacing employed between the ruled or two-tone screen and the sensitive emulsion when exposing the emulsion to make a contact screen. A two-tone screen is one which must be spaced from a sensitive emulsion when making a halftone image or a contact screen therethrough. Ordinary ruled screens are two-tone screens, that is, they have just two tones, opaque and clear. According to the prior art when making either a halftone image or a contact halftone screen, the screen spacing should be $$\frac{d^2}{3\lambda}$$

where $d$ is the width of the screen openings. In other words this distance should be $$\frac{D^2}{12\lambda} \text{ or } \frac{1}{12N^2\lambda}$$

for a screen with equal width lines and spaces, D being the distance between the center of adjacent screen openings and N being the number of lines per linear unit. If N is the number of lines per inch and $\lambda$ is measured in inches, this formula gives the screen distances in inches. This screen distance is not at all critical—in other words, the screen has considerable "depth of focus," so that values between $$\frac{1}{24N^2\lambda} \text{ and } \frac{1}{6N^2\lambda}$$

are usable. This is known. It is also common practice sometimes merely to choose a screen distance equal to either 64 or 90 times the width of the screen opening, and these values lie between the above limits for screens between 60 and 150 lines per inch. These methods are fairly satisfactory for making contact screens of medium fineness. However, with very fine screens, the distance determined by the first of these methods is too short to be usable while the second method fails to give a satisfactory diffraction pattern. Contrary to some of the early schools of thought, the diffraction pattern is a controlling factor in halftone exposures.

According to the present invention, an eminently satisfactory diffraction pattern is obtained with the screen at 12 times the distance prescribed by the prior art. That is, the new screen distance is given by the formula $$\frac{1}{N^2\lambda}$$

Since it is common practice to measure wavelengths of light in millimicrons rather than in inches, the above formula gives the screen distance in inches as equal to $$\frac{25.4 \times 10^6}{N^2\lambda}$$

N being the number of lines per inch in this case. For light of wavelength equal to 435 millimicrons this screen distance works out to 0.36 inch for screens of 400 lines per inch. This screen distance is obviously large enough to be useful. For comparison with the prior art it is noted that the screen distance should be about one foot when using a 70 line per inch screen.

When this screen distance is used, the screen has less depth of focus, so that with monochromatic light the screen distance should be held accurately within ±10%, preferably within ±5%. With polychromatic light, the distance should lie between the distances calculated from the limits of the wavelength band used. In making contact screens it is common practice and usually desirable to have the light source far enough away to be considered as being at infinity. Should a shorter distance be used for any reason, the screen distances should be increased. In fact screen distances obey the same law as the focal length of a lens, i. e. they should be greater if the object distance (the distance to the light source) is shorter. We refer to such minor adjustments as having a light source at a distance effectively infinite, since the source is always at a relatively great distance. The light need only be approximately monochromatic and the above formula applies to the predominate or average wavelength of the exposing light.

One particularly valuable feature of the present invention is the fact that the size and shape of the openings in the master screen are of little importance, for example a master screen with round apertures gives just the same kind of pattern as the conventional cross line screen. This is due to the fact that a diffraction pattern is produced by the interaction of the light from 25 or more openings in the screen and depends on their spacing rather than their shape and size. As a result of this feature it is possible to make use of master screens which have also been made photographically since such master screens often have rounded openings. Thus the present invention is useful either with a standard crossline screen with substantially square openings or with screens which have non-rectangular openings.

There is an intermediate screen distance which has a fair diffraction pattern, given by the formula $$\frac{0.28}{N^2\lambda}$$

but the contrast of the pattern is much lower than that according to the present invention and hence it is of less practical value; for a 200 line screen this is not greatly different from the old system using 90 times the width of the screen openings. Even with the finest screens however the 90 times rule does not approximate the spacing according to the present invention.

At a screen separation of $$\frac{0.4}{N^2\lambda}$$

a pattern with twice the number of lines per inch is produced, which is particularly applicable to systems for doubling the screen ruling, in accordance with the invention described in our copending application Serial No. 670,734 filed concurrently herewith. However, the other screen distances described herein may also be used in making "doubled" screens.

It is noted that the diffraction pattern concerned is the one produced by a two-tone screen having rectilinearly distributed elements, for example a crossline screen. Incidentally the screen distance according to the present invention would not be satisfactory for making ordinary halftone negatives or positives since this particular diffraction pattern would cause the loss of all fine detail in the original. In the making of contact screens however, all areas are exposed at the same level and all elements or dots are substantially identically exposed. There are no highlight or shadow areas.

The accompanying drawing illustrates diagrammatically the exposing of a sensitive material to make a contact halftone screen according to the present invention.

In the drawing, light from a lamp 10 and reflector 11 passes through a filter 12 so that the exposing light is predominately of wavelength $\lambda$. This light is then diffused by a ground glass 13 to uniformly illuminate an aperture 14. A field lens may be included over the aperture and four lamps instead of a single lamp, or four or more mirrors arranged in a pyramid around a single lamp may be used to provide a uniform distribution of light at the film plane as described in our copending application referred to above. This light exposes a sensitive film 16 through a master two-tone screen 15 having N lines per inch. The screen spacing between the screen 15 and the film 16, according to the present invention is made equal to $$\frac{1}{N^2\lambda}$$

The distance between the exposing aperture 14 and the film 16 is effectively infinite. If a lesser distance is used, the separation of the screen 15 and the film 16 should be increased slightly in accordance with the conjugate distance formula for simple lenses. The screen spacing is given in whatever units the wavelength and the number of lines are measured in. That is, the screen spacing is given in inches when the wavelength is measured in inches and the number of lines is the number per inch.

Our invention is not limited to this structure but is of the scope of the appended claims.

We claim:

1. The method of manufacturing contact halftone screens which comprises exposing a photosensitive layer to an effectively small light source at a distance effectively infinite, through a two-tone screen with rectilinearly distributed elements, said two-tone screen being spaced from the layer at a distance $$\frac{1}{N^2\lambda}$$

units ±10% where N is the number of elements per linear unit of the two-tone screen and $\lambda$ is the predominant wavelength of the exposing light measured in the same units, and processing the layer.

2. The method according to claim 1 in which the two-tone screen has at least 200 elements per linear inch.

3. The method according to claim 1 in which the two-tone screen is a crossline screen with substantially square openings.

4. The method according to claim 1 in which the two-tone screen has non-rectangular openings.

JOHN A. C. YULE.
FREDERICK B. JOHNSTON.

REFERENCES CITED

The following references are of record in the file of this patent:

UNITED STATES PATENTS

| Number | Name | Date |
| --- | --- | --- |
| 1,995,958 | Bennett | Mar. 26, 1935 |
| 2,095,909 | Bennett | Oct. 12, 1937 |
| 2,292,313 | Yule | Aug. 4, 1942 |
| 2,311,071 | Murray | Feb. 16, 1943 |